United States Patent [19]

Yokota

[11] Patent Number: 5,258,147
[45] Date of Patent: Nov. 2, 1993

[54] METHOD OF DETECTING INJECTED AMOUNT FROM AN INJECTION MOLDER

[75] Inventor: Akira Yokota, Hirakata, Japan

[73] Assignee: Komatsu Ltd., Tokyo, Japan

[21] Appl. No.: 761,731

[22] PCT Filed: Jan. 23, 1991

[86] PCT No.: PCT/JP91/00065
§ 371 Date: Sep. 13, 1991
§ 102(e) Date: Sep. 13, 1991

[87] PCT Pub. No.: WO91/11315
PCT Pub. Date: Aug. 8, 1991

[30] Foreign Application Priority Data

Jan. 24, 1990 [JP] Japan .................................. 2-14383

[51] Int. Cl.$^5$ ............................................. B29C 45/76
[52] U.S. Cl. ................................... 264/40.1; 264/40.5; 425/145; 425/149
[58] Field of Search .................. 264/40.1, 40.5, 328.1; 425/135, 145, 146, 147, 149, 150

[56] References Cited

U.S. PATENT DOCUMENTS

| | | | |
|---|---|---|---|
| 3,693,946 | 9/1972 | Merritt | 425/145 |
| 3,767,339 | 10/1973 | Hunkar | 425/145 |
| 3,822,057 | 7/1974 | Wheeler | 425/145 |

FOREIGN PATENT DOCUMENTS

| | | | |
|---|---|---|---|
| 52-151352 | 12/1977 | Japan . | |
| 61-241113 | 10/1986 | Japan | 264/328.1 |
| 63-150632 | 6/1988 | Japan . | |

*Primary Examiner*—Jill L. Heitbrink
*Attorney, Agent, or Firm*—Armstrong, Teasdale, Schlafly & Davis

[57] ABSTRACT

A method of detecting the amount of plasticized synthetic resin injected from the cylinder of an injection molder to fill the cavity of a mold. The objective is to ensure a high accuracy in detecting the injected amount, on the injection molder side, in continuous molding production. The injected amount is detected by obtaining the resin amount in the cylinder before and after the injection process, under the condition that the resin pressure is kept at a predetermined value under the block valve and check valve closed.

8 Claims, 2 Drawing Sheets

METHOD OF DETECTING INJECTED AMOUNT FROM AN INJECTION MOLDER

FIELD OF THE INVENTION

The present invention relates to a method of detecting the amount of plasticized synthetic resin injected from the cylinder of an injection molder to fill the cavity of a mold.

BACKGROUND OF THE INVENTION

For continuous production of desired moldings by an injection molder, plasticized synthetic resin is injected from the cylinder of the molder through the nozzle into the cavity of a mold connected to the nozzle. In such continuous molding, it is essential to inject plasticized synthetic resin by the amount corresponding precisely to the inside capacity of the cavity, in other words, the volume of an intended product. If the injected amount is greater than required, the resin is forced out through the parting line of the mold to form flash. On the other hand, if the injected amount is less than required, recesses or sinks are formed on the molded surface, resulting in a defective product.

Conventionally, for continuous production of moldings with a stable quality, the amount of plasticized synthetic resin injected to fill the mold cavity is detected on the basis of the position of the screw in the injection molder, as described in the following:

i) The injected amount is detected on the basis of the screw position before the plasticized synthetic resin is injected into the mold cavity.

ii) The injected amount is detected on the basis of the following screw position upon completion of dwelling after the plasticized synthetic resin is injected into the mold cavity.

1) The position of the screw at the forward limit for dwelling
2) The position of the screw released from the dwelling pressure after dwelling is completed.

However, both of these conventional methods have a problem that the detection may not be accurate because of the following reasons:

Method of i)

The resin pressure of the plasticized synthetic resin in the cylinder of the injection molder is not controlled nor monitored until immediately before the plasticized synthetic resin is injected through the injection molder nozzle into the mold cavity. Therefore, the compressible plasticized synthetic resin does not always provide a constant resin pressure. Particularly when the screw is retreated forcibly to reduce the resin pressure in the cylinder for preventing the resin from leaking through the injection molder nozzle, the resin pressure fluctuates due to the air drawn through the nozzle end.

Furthermore, the check valve provided at the front end of the screw is open before the injection process because pressure is not applied to the screw. Consequently, when pressure is applied to the screw for injection, small amount of the resin flows back as the check valve is closed. This also results in the poor detection accuracy.

Method of ii)

Based on the position 1)

The dwelling pressure is varied to meet various molding conditions for products. The compression amount of compressible plasticized synthetic resin varies depending upon the dwelling pressure, thus hampering the detection accuracy.

High detection accuracy could be achieved if the resin amount in the cylinder of the injection molder was compared under a fixed dwelling pressure. However, since the dwelling pressure is one of the essential molding conditions determining the shape and dimensions of a product, it is impracticable to use a fixed dwelling pressure.

Based on the position 2)

After the screw stops applying the dwelling pressure on the resin in the cylinder, the resin is released from the pressure, taking different times depending on the kind and temperature of the plasticized synthetic resin. Therefore, it is difficult to know whether or not the pressure has been removed completely. This uncertainty also leads to the poor detection accuracy.

Although it takes time for the resin to be released from the dwelling pressure, in general, only short time is assigned for this purpose in the actual production, to avoid reduction in the productivity.

To solve these problems, the object of the present invention is to provide a method of detecting the injected amount of an injection molder, which permits accurate detection, on the injection molder side, of the amount of plasticized synthetic resin injected by the injection molder into the cavity of a mold.

DISCLOSURE OF THE INVENTION

In order to achieve the above object, according to the present invention, the injected amount is detected by obtaining the positional values of a screw before injection and after injection and dwelling or the resin amount in the injection molder cylinder corresponding to each of the positional values, under the condition which meets the requirements below; and calculating the value corresponding to the amount of plasticized synthetic resin injected into the cavity of a mold or the injected amount itself, on the basis of the above two positional values of the screw or the resin amount in the injection molder cylinder corresponding to each of the positional values.

A. The positional value of the screw or the resin amount in the cylinder corresponding to the positional value must be obtained with the check valve at the front end of the screw being closed.

B. The positional value of the screw or the resin amount in the cylinder corresponding to the positional value must be obtained with the pressure of the plasticized synthetic resin maintained at a predetermined value.

C. Molded products have to be free from the influence of the pressure of the plasticized synthetic resin when the positional value of the screw or the resin amount in the cylinder corresponding to the positional value is obtained.

Thus, according to the present invention, the method of detecting the amount of plasticized synthetic resin injected from the cylinder of an injection molder into the cavity of a mold comprises the steps of:

(a) providing, between the cylinder and the cavity, a flow path opening/closing mechanism capable of blocking the flow of plasticized synthetic resin between the cylinder and the cavity;

(b) closing said flow path opening/closing mechanism to block the resin flow prior to injecting the resin from the cylinder into the cavity, (c) applying a predetermined pressure to the screw under the state of the resin flow being blocked, to effect a balancing movement of the screw, (d) obtaining the positional value of the screw at a first position where the screw stops its balancing movement, or the resin amount in the cylinder corresponding to said positional value, (e) opening said flow path opening/closing mechanism to allow the plasticized synthetic resin to flow through, (f) applying said predetermined pressure to the screw under said flow path closing mechanism kept open, to inject the plasticized synthetic resin into said cavity, (g) closing said flow path opening/closing mechanism to block the resin flow upon completion of injection and dwelling, (h) applying a predetermined pressure to the screw under the state of the resin flow being blocked, to effect a balancing movement of the screw, (i) obtaining the positional value of the screw at a second position where the screw stops its balancing movement, or the resin amount in the cylinder corresponding to said positional value, and (j) obtaining the value corresponding to the injected amount or the injected amount itself, by operations including subtraction of the positional value of the screw at said second stop position or the resin amount in the cylinder corresponding to this positional value from the positional value of the screw at said first stop position or the resin amount in the cylinder corresponding to this positional value.

If a predetermined pressure is applied to the screw with the flow path opening/closing mechanism placed between the injection molder cylinder and the mold cavity being closed, the check valve at the front end of the screw is closed or is kept closed, and the screw moves for balancing the pressure and stops. When the screw is at this first stop position, the plasticized synthetic resin in front of the screw in the cylinder has a predetermined resin pressure which corresponds to the pressure applied to the screw. The positional value of the screw or the resin amount in the cylinder corresponding to the positional value before injection of the resin is obtained under this predetermined resin pressure.

Then, when the flow path opening/closing mechanism is opened, the screw is moved forward so that the plasticized synthetic resin is injected into the mold cavity.

The injection process is followed by dwelling. When dwelling is completed, the flow path opening/closing mechanism is closed. If a predetermined pressure is applied to the screw at this stage with the flow path opening/closing mechanism kept closed, the check valve at the front end of the screw is closed or kept closed, and the screw moves for balancing the pressure and stops. When the screw is at this second stop position, the resin in front of the screw in the cylinder has a predetermined resin pressure corresponding to the pressure applied to the screw. The positional value of the screw or the resin amount in the cylinder corresponding to the positional value after the completion of injection and dwelling is obtained under this predetermined resin pressure.

Finally, the value corresponding to the injected amount or the injected amount itself is obtained by operations including subtraction of the positional value of the screw at the second stop position or the resin amount in the cylinder corresponding to this positional value from the positional value of the screw at the first stop position or the resin amount in the cylinder corresponding to this positional value.

According to the present invention, as described above, a predetermined pressure is applied to the screw with the flow path opening/closing mechanism in the closed state, so that the check valve is closed or kept closed and that a predetermined resin pressure is generated in the plasticized synthetic resin. Under this condition, the value corresponding to the injected amount or the injected amount itself is obtained, through operations including subtraction, on the basis of the positional values of the screw at the first and second stop positions or the resin amount in the cylinder corresponding to each of the positional values. Accordingly, it is possible to detect, on the injection molder side, the amount of plasticized synthetic resin injected into the cavity of a mold with high accuracy. In addition, the flow path opening/closing mechanism is kept closed when the predetermined resin pressure is generated to obtain the positional values of the screw at the first and second stop positions or the resin amount in the cylinder corresponding to each of the positional values. Thus, finished products are not affected by the pressure applied to the screw. In other words, the injected amount can be detected accurately regardless of the molding condition.

Furthermore, it is possible to indicate the irregularities by a signal if the positional value of the screw at the first stop position or the resin amount in the cylinder corresponding to this positional value, the positional value of the screw at the second stop position or the resin amount in the cylinder corresponding to this positional value, or the difference between the first and second positional values or between the resin amounts corresponding to the first and second positional values is out of the predetermined range. The irregularity signal for the first positional value of the screw or the resin amount corresponding to the first positional value indicates that a product will not be molded properly. The irregularity signal for the second positional value of the screw, the resin amount corresponding to the second positional value, or the difference between the first and second positional values of the screw or between the resin amounts in the cylinder corresponding to the first and second positional values indicates that a product has not been molded properly.

BRIEF DESCRIPTION OF THE DRAWINGS

FIGS. 1 and 2 show a preferred embodiment of the method of detecting the injected amount of an injection molder according to the present invention:

FIG. 1 is a schematic vertical section of an entire injection molder including a mold.

PREFERRED EMBODIMENTS OF THE INVENTION

The method of detecting the injected amount of an injection molder according to the present invention is described in detail with reference to the accompanying drawings.

Figure 1:
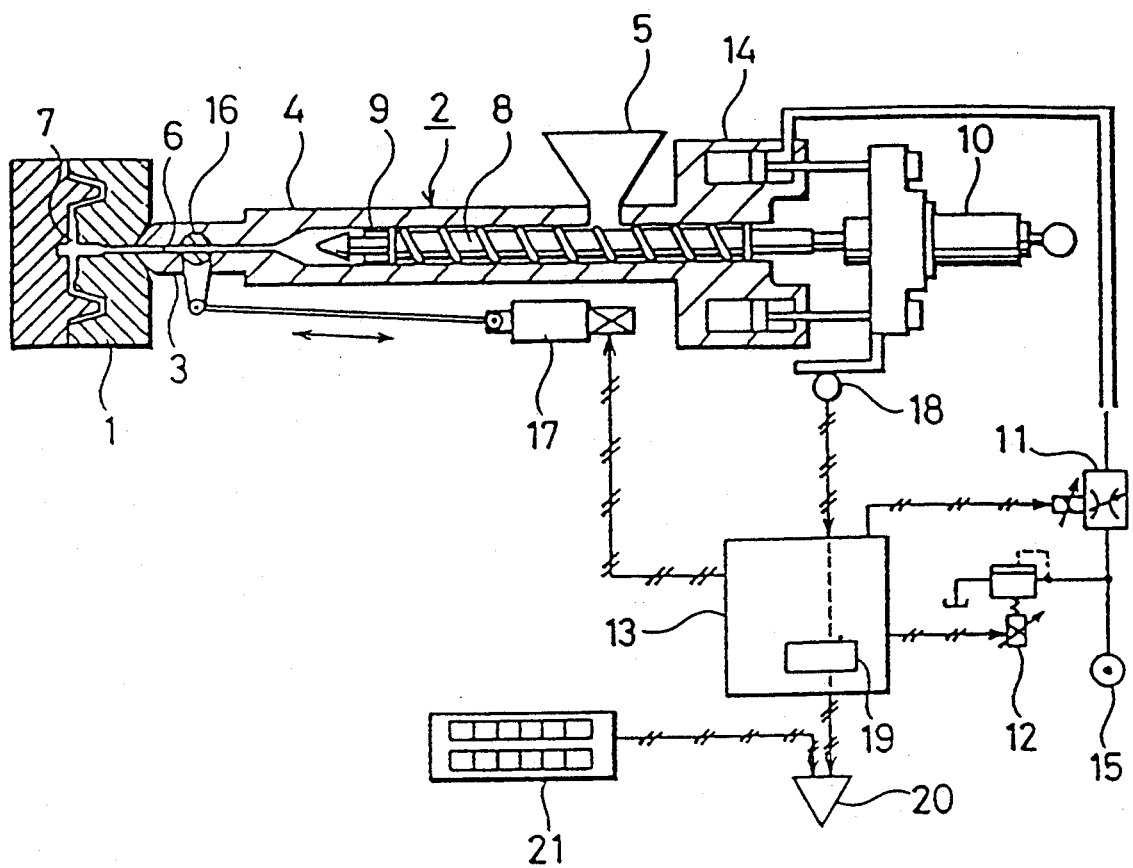

Referring to FIG. 1, the injection molder 2 is connected through a nozzle 3 with a mold 1 in which a product is to be injection molded. The injection molder 2 has a cylinder 4 containing a screw 8. In the heated cylinder 4, resin pellets supplied from a hopper 5 are melted and mixed, and forced out by the screw 8 through a flow path 6 formed in the nozzle 3 to fill the cavity 7 in the mold 1. A check valve 9 is provided on the front end of the screw 8. The screw 8 is rotated for melting and mixing the resin pellets, by a screw-driving motor 10. An injection piston 14 is operated by means of oil pressure, to apply a predetermined pressure to the screw 8 and to drive the screw 8 for forward and backward motions including the balancing movement toward the nozzle 3 to inject the resin into the cavity 7. The pressure oil flow is controlled by an electromagnetic flow valve 11 and an electromagnetic pressure valve 12 both of which are operated by a controller 13. 15 is a pressure oil source.

As the flow path opening/closing mechanism of the present invention, a block valve 16 is provided in the flow path 6 of the nozzle 3 to block the flow of the molten resin. The opening and closing of the block valve 16 is operated by a driving unit 17 through the controller 13. A screw position detector 18 gives the positional data of the screw 8 in the cylinder 4 to the controller 13.

On the basis of the positional data of the screw 8 supplied from the screw position detector 18, the controller 13 operates the electromagnetic flow valve 11, the electromagnetic pressure valve 12 and the driving unit 17 according to a predetermined program, thus driving the screw 8 for a balancing movement toward or away from the nozzle 3, applying a predetermined pressure to the screw 8, and operating the block valve 16. Also on the basis of the positional data, a processor 19 calculates the amount of resin injected into the cavity 7 of the mold 1. The calculated result is input to a comparator 20 which compares the result with the range of value corresponding to the injected amount, predetermined in a range setter 21. If the result is out of the predetermined range, the comparator 20 outputs an irregularity signal.

Figure 2A:
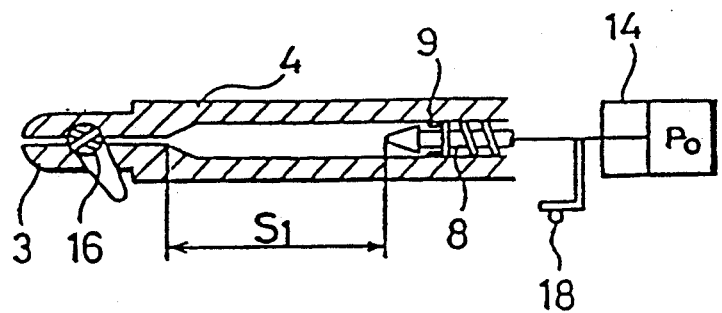
FIGS. 2(A), 2(B) and 2(C) show the movement of the flow path closing mechanism and check valve for various positions of the screw.

In obtaining the resin amount injected into the cavity 7 of the mold 1, each part of the injection molder operates as follows:

i) Before injection [FIG. 2(A)]

Figure 2B:
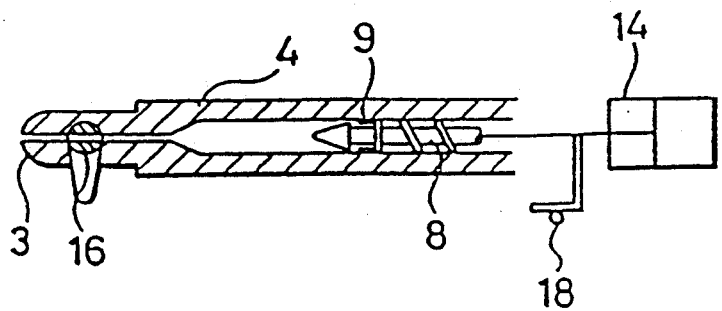

The block valve 16 is closed. A specific pressure $P_0$ is applied by the injection piston 14 to the screw 8 under the block valve 16 kept closed. Then, the screw 8 makes a balancing movement or moves forward, for example, and stops at the first position. The screw position detector 18 detects the positional value $S_1$ of the screw 8 which corresponds to the amount of the resin existing in front of the screw 8 at the first stop position in the cylinder 4. The positional value $S_1$ thus detected is sent to the controller 13.

ii) During injection [FIG. 2(B)]

Figure 2C:
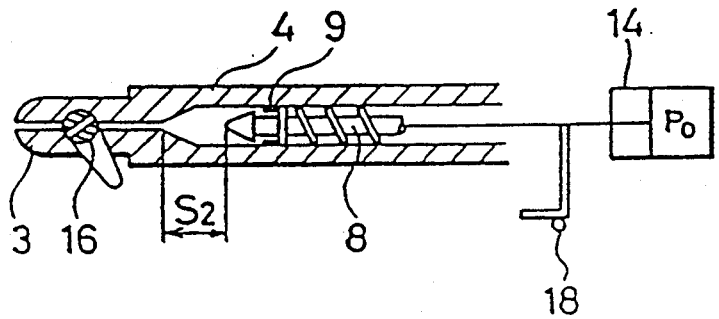

The block valve 16 is opened, and the screw 8 is moved forward to inject the molten resin into the cavity 7 of the mold 1. The process of the resin injection into the cavity 7 is the same as that with a general injection molder.

iii) After the completion of the injection and dwelling [FIG. 2 (C)]

The block valve 16 is closed again, and the predetermined pressure $P_0$ is applied by the injection piston 14 to the screw 8 under the block valve 16 kept closed. Similar to the case before injection, the pressure $P_0$ drives the screw 8 for a balancing movement. Specifically, the screw 8 is moved backward when the dwelling pressure is greater than the pressure $P_0$, and is moved forward when it is smaller than $P_0$. Then, the screw 8 stops at the second position. At this time, the screw position detector 18 detects the positional value $S_2$ of the screw 8 which corresponds to the amount of the resin existing in front of the screw 8 at the second stop position in the cylinder 4. The positional value $S_2$ thus detected is sent to the controller 13.

When the positional values $S_1$ and $S_2$ of the screw 8 at the first and second stop positions are detected, the screw 8 remains stationary after the balancing movement caused by the predetermined pressure $P_0$ applied to the screw 8. Therefore, the check valve 9 at the front end of the screw 8 is closed or kept closed during this detection process, so that the amount of the resin existing in front of the screw 8 in the cylinder 4, that is, in the space between the nozzle 3 and the front end of the screw 8 is fixed.

The processor 19 calculates the value corresponding to the injected amount by subtracting the positional value $S_2$ of the screw 8 at the second stop position from the positional value $S_1$ of the screw 8 at the first stop position ($S_1-S_2$), and outputs the result to the comparator 20.

According to the present embodiment of the invention, only the value corresponding to the injected amount is input to the comparator 20. Alternatively, the positional values $S_1$ and $S_2$ of the screw 8 detected by the screw position detector 18 may be input through the controller 13 to the comparator 20. In such a case, the comparator 20 compares the input values with the normal range of positional values predetermined in the range setter 21. If either value is out of the normal range, the comparator 20 outputs an irregularity signal indicating that a product will not be or has not been formed properly.

According to the present embodiment, the positional value $S_2$ of the screw 8 at the second stop position is subtracted from the positional value $S_1$ of the screw 8 at the first stop position ($S_1-S_2$) to obtain the value for the injected amount. Alternatively, the actual injected amount may be calculated directly from the actual resin amounts detected with the screw 8 at the first and second stop positions, respectively. Needless to say, the actual resin amounts may be calculated from the positional values $S_1$ and $S_2$ of the screw 8.

Furthermore, according to the present embodiment, same predetermined pressure $P_0$ is applied to the screw 8 before injection and after the completion of the injection and dwelling. The pressure applied after injection and dwelling may be different from that applied before injection. In such a case, the pressure difference should be taken into consideration when calculating the injected amount or the value corresponding to the injected amount on the basis of the actual resin amounts or the positional values $S_1$ and $S_2$ of the screw 8 at the first and second stop positions.

Instead of the block valve 16 in the flow path 6 of the nozzle 3, a gate may be provided to control the plasticized synthetic resin flow to the cavity 7 of the mold 1.

POTENTIAL INDUSTRIAL APPLICATION OF THE INVENTION

The present invention permits a high accuracy in detecting the amount of plasticized synthetic resin injected into the cavity of a mold. Therefore, the invention is applicable to the simultaneous production of a plurality of moldings of homogeneous quality, using a form having a plurality of molding cavities therein.

What is claimed is:

1. A method of detecting the amount of plasticized synthetic resin injected from an injection molder comprising a cylinder having a screw therein, and a flow path opening/closing mechanism capable of blocking the flow of plasticized resin between the cylinder and a cavity of a mold, the method comprising the steps of:

(a) closing the flow path opening/closing mechanism to block the flow of resin prior to injecting resin from the cylinder into the cavity;
   (b) applying a predetermined pressure to the screw while the flow of resin is blocked, to effect a balancing movement of the screw;
   (c) obtaining the positional value of the screw at a first stop position where the screw stops its balancing movement, or the resin amount in the cylinder corresponding to said positional value;
   (d) opening said flow path opening/closing mechanism to allow the plasticized synthetic resin to flow from the cylinder to the cavity of the mold;
   (e) applying pressure to the screw while the flow path opening/closing mechanism is open, to inject plasticized synthetic resin into the cavity;
   (f) closing the flow path opening/closing mechanism to block the flow of resin upon completion of injection and dwelling;
   (g) applying a predetermined pressure to the screw, while the resin flow is blocked, to effect a balancing movement of the screw;
   (h) obtaining the positional value of the screw at a second stop position where the screw stops its balancing movement, or the resin amount in the cylinder corresponding to said positional value; and
   (i) obtaining the value corresponding to the injected amount or the injected amount itself, by operations including subtraction of the positional value of the screw at said second stop position or the resin amount in the cylinder corresponding to this positional value from the positional value of the screw at said first stop position or the resin amount in the cylinder corresponding to this positional value.

2. The method according to claim 1, wherein the predetermined pressure applied, while the flow path opening/closing mechanism is closed to block the flow of plasticized synthetic resin, to the screw after injection and dwelling is the same as that applied before injection.

3. The method according to claim 2 wherein the flow path opening/closing mechanism is a block valve provided in the nozzle of the injection molder.

4. The method according to claim 2, wherein said flow path opening/closing mechanism is a gate provided on said mold.

5. The method according to claim 2 wherein an irregularity is indicated by a signal when the positional value of the screw at said first stop position or the resin amount in the cylinder corresponding to this first positional value, the positional value of the screw at said second stop position or the resin amount in the cylinder corresponding to this second positional value, or the difference between said first and second positional values of the screw or between the resin amounts corresponding to said first and second positional values, respectively, is out of a predetermined range.

6. The method according to claim 1 wherein the flow path opening/closing mechanism is a block valve provided in the nozzle of the injection molder.

7. The method according to claim 1, wherein said flow path opening/closing mechanism is a gate provided on said mold.

8. The method according to claim 1, wherein an irregularity is indicated by a signal when the positional value of the screw at said first stop position or the resin amount in the cylinder corresponding to this first positional value, the positional value of the screw at said second stop position or the resin amount in the cylinder corresponding to this second positional value, or the difference between said first and second positional values of the screw or between the resin amounts corresponding to said first and second positional values, respectively, is out of a predetermined range.

* * * * *